(12) United States Patent
Serizawa (10) Patent No.: US 6,363,227 B1
(45) Date of Patent: Mar. 26, 2002

(54) IMAGE FORMING APPARATUS AND CONTROL METHOD FOR IMAGE FORMING APPARATUS WHICH DETECTS A STATUS CHANGE WITH RESPECT TO AN ABNORMALITY IN THE APPARATUS

(75) Inventor: Yoji Serizawa, Gotenba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/595,881

(22) Filed: Jun. 20, 2000

(30) Foreign Application Priority Data

Jun. 24, 1999  (JP) .......................................... 11-178218

(51) Int. Cl.⁷ .......................... G03G 15/00; G06F 11/00
(52) U.S. Cl. ......................................... 399/18; 358/296
(58) Field of Search ..................... 399/18, 19; 358/296, 358/1.14

(56) References Cited

U.S. PATENT DOCUMENTS

| 5,706,410 A | 1/1998 | Bagley et al. | 395/112 |
| 5,872,635 A | 2/1999 | Akiyama | 358/296 |
| 6,078,400 A | * 6/2000 | Mizutani | 358/1.14 |

FOREIGN PATENT DOCUMENTS

| EP | 0740452 A2 | 4/1996 | H04N/1/00 |
| EP | 0802502 A2 | 4/1997 | G06K/15/00 |
| JP | 8-295066 | 11/1996 | H04N/1/00 |
| JP | 9-146413 | 6/1997 | |

* cited by examiner

Primary Examiner—Quana M. Grainger
(74) Attorney, Agent, or Firm—Fitzpatrick, Cella, Harper & Scinto

(57) ABSTRACT

It is an object of the invention to make it possible to extend a degree of freedom on designing and further improve the reliability when an output control is performed according to a status change of a printer engine. When there is the status change of the printer engine, whether an output monitoring timer of a CCRT signal is OFF or not is detected. If NO, whether the counting operation of the timer has been finished or not is discriminated. When the counting operation of the timer is finished, the timer operation is stopped. After the timer operation was stopped, the CCRT signal is set to "true". When a status request command from an image controller is received, a transmission preparation of a current state of the printer engine is started. After completion of the transmission preparation of the status signal, an SBSY signal is set to "true" and the CCRT signal is set to "false". After that, the timer is set to a predetermined value and the counting operation is started.

12 Claims, 9 Drawing Sheets

| BIT | CONTENTS |
|---|---|
| 1ST BIT | 0 |
| 2ND BIT | TIME FOR CCRT "FALSE" $2^5$ |
| 3RD BIT | TIME FOR CCRT "FALSE" $2^4$ |
| 4TH BIT | TIME FOR CCRT "FALSE" $2^3$ |
| 5TH BIT | TIME FOR CCRT "FALSE" $2^2$ |
| 6TH BIT | TIME FOR CCRT "FALSE" $2^1$ |
| 7TH BIT | TIME FOR CCRT "FALSE" $2^0$ |
| 8TH BIT | ODD PARITY |

IMAGE FORMING APPARATUS AND CONTROL METHOD FOR IMAGE FORMING APPARATUS WHICH DETECTS A STATUS CHANGE WITH RESPECT TO AN ABNORMALITY IN THE APPARATUS

BACKGROUND OF THE INVENTION

1. Field of the Invention

The invention relates to an image forming apparatus and a control method for the image forming apparatus. More particularly, the invention relates to an image forming apparatus such as an electrophotographic printer or the like which can detect a status change in the apparatus such as presence or absence or jam of recording papers, another abnormality, or the like and to a control method for the image forming apparatus.

2. Related Background Art

Hitherto, in the image forming apparatus such as an electrophotographic printer or the like, various signals are transmitted and received between an image controller and a printer controller and the printer controller controls various mechanical parts in the printer on the basis of results of the signal reception, thereby performing a desired image forming process.

When a status change such as absence or jam of the recording papers, another abnormality, or the like occurs in the apparatus, the image controller is notified of information indicative of such a status change via the printer controller, thereby enabling the image controller to always confirm the presence or absence of the status change.

Figure 8:
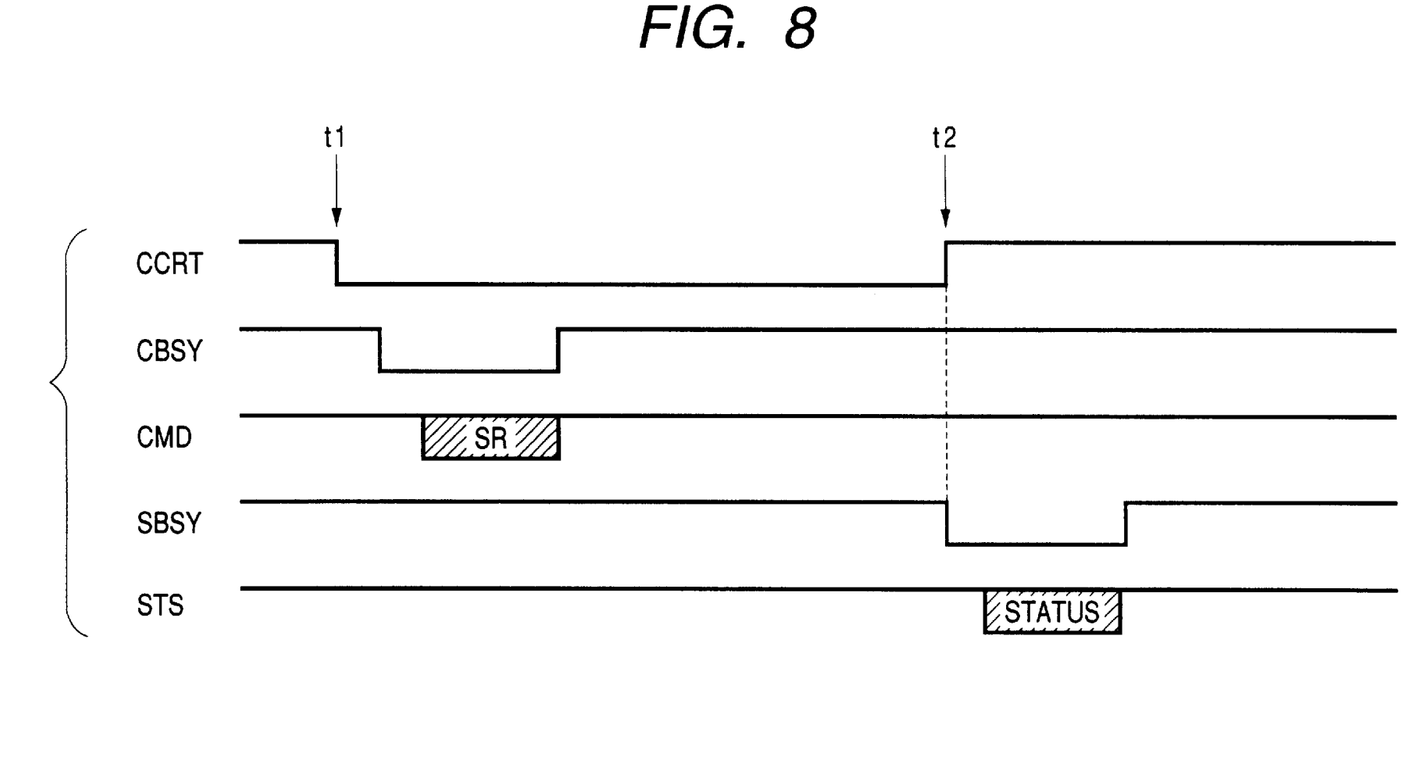
FIG. 8 is a timing chart showing conventional generation timings for various signals in the image forming apparatus.

FIG. 8 is a timing chart showing generation timings of the various signals of the image forming apparatus.

That is, as shown in FIG. 8, when the printer controller detects a status change (absence of papers, or the like) of the printer engine at time t1, the printer controller changes a status change signal (CCRT signal) indicative of the status change from "false" to "true" and transmits the "true" CCRT signal to the image controller. The image controller which received the "true" CCRT signal transmits a CBSY signal (strobe signal) as a serial command transmission permission signal to the printer controller and, thereafter, transmits a status request command (SR) to the printer controller by a serial command signal (CMD signal). Subsequently, the printer controller starts a preparation to return a status signal (STATUS) showing which status has been changed to the image controller. At time t2 when the preparation for returning is finished, the printer controller sets a status transmission permission signal, namely, SBSY signal (strobe signal) indicating that the preparation for returning the status information has been finished to "true" and returns the "true" SBSY signal to the image controller. At the same time, the printer controller resets the CCRT signal to "false" and, thereafter, transmits the status information to the image controller by the status signal (STS signal).

Techniques similar to that mentioned above have been also disclosed in Japanese Patent Applications Nos. 8-295066 and 9-146413.

Figure 9:
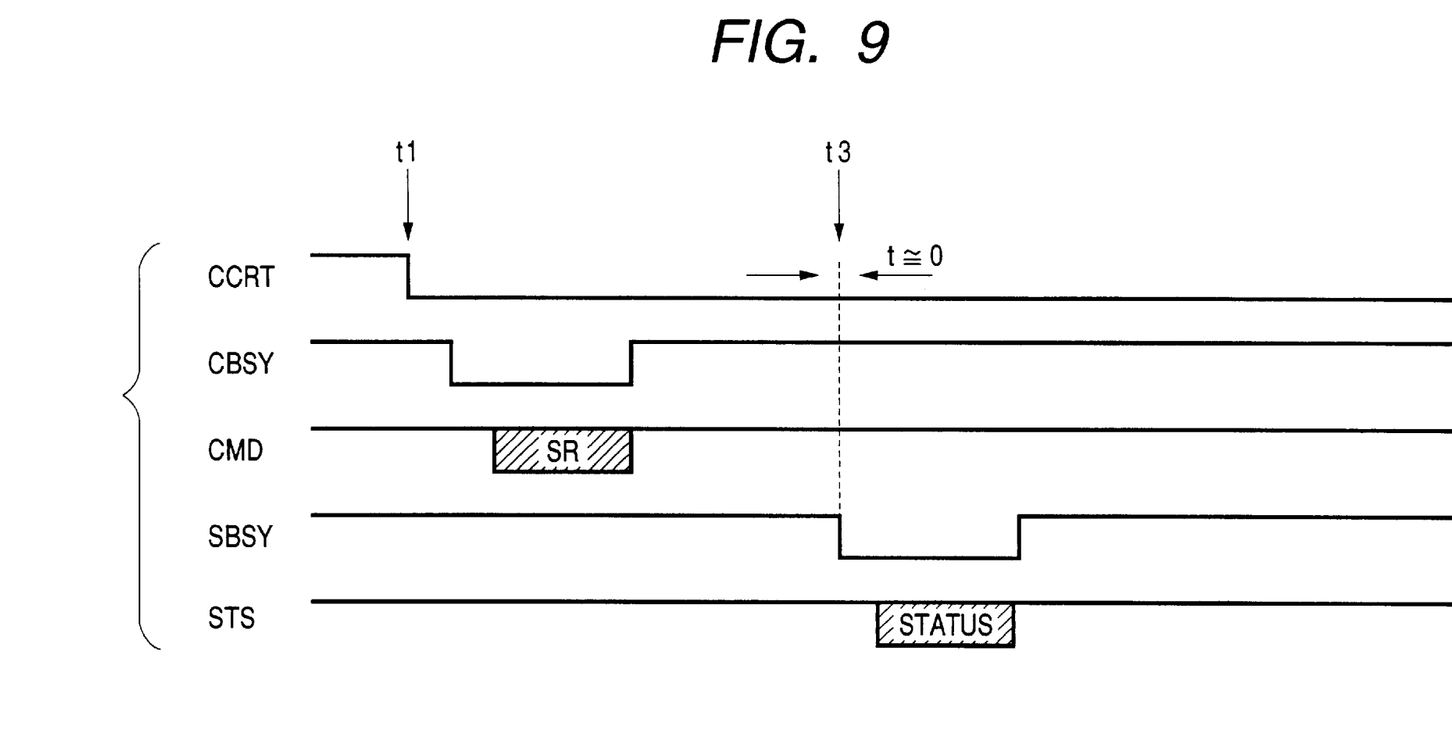
FIG. 9 is a timing chart showing generation timings for various signals indicative of a problem of the conventional image forming apparatus.

In the above conventional image forming apparatus, however, after the status changes occurred and the CCRT signal was changed from "false" to "true" at time t1 as mentioned above, the CCRT signal is reset from "true" to "false" at time t2 when the preparation for returning the status signal is finished. However, as shown at time t3 in FIG. 9, if another status change occurs almost simultaneously with the reset timing to "false" of the CCRT signal, although the CCRT signal is instantaneously set to "false", the "false" period becomes almost "0". That is, for example, in the case where the CCRT signal is set to "true" because of the occurrence of the absence of the papers and, thereafter, when the preparation for returning the status information is completed and the CCRT signal is changed to "false", if another status change, for example, an error occurred in an optical system almost simultaneously with the change of the CCRT signal to "false", the CCRT signal is immediately set to "true" again. Thus, the "false" period becomes almost "0".

It is desirable that the image controller recognizes the contents of the CCRT signal indicative of the status change at a period as early as possible and as promptly as possible. For this purpose, in many cases, the image controller detects the CCRT signal by an interruption detection input or the like in a hardware manner.

However, in the case where the user intends to detect the CCRT signal in a hardware manner, since there is a case where the "false" period of the CCRT signal becomes almost "0" as mentioned above, there are such problems that a limitation on designing is large in a filter setting for removing noises or the like and the reliability of the apparatus is also low.

In case of grasping the status change by detecting the change of the CCRT signal from "false" to "true", there is such a fear that the status change cannot be grasped.

SUMMARY OF THE INVENTION

The invention is made in consideration of the above problems and it is an object of the invention to provide an image forming apparatus which can raise a degree of freedom on designing and further improve the reliability and provide a control method for such an image forming apparatus.

According a preferred aspect of the invention, the above object is accomplished by an image forming apparatus comprising: image control means for controlling a formation of image data; image forming means for forming the image data onto a recording paper and outputting; and image formation control means for transmitting and receiving a signal to/from the image control means and controlling the image forming means, wherein the image formation control means has status change notifying means for detecting status change information of the image forming means and notifying the image control means of the status change information, status information forming means for forming status information of the image forming means when the status change information is notified to the image control means by the status change notifying means, status information notifying means for notifying the image control means of the status information formed by the status information forming means, and cancelling means for cancelling the status change information detected by the status change notifying means in response to after completion of the formation of the status information by the status information forming means, and the image formation control means has cancel state maintaining means for maintaining a cancel state cancelled by the cancelling means at least for a predetermined time.

According to another aspect of the invention, there is provided an image forming apparatus comprising: image forming means for forming an image onto a recording medium on the basis of image data sent from an external apparatus; obtaining means for obtaining status change information of the image forming means; status change notifying means for notifying the external apparatus of the status change information; status information forming means for forming status information of the image forming means when the status change information is notified; and cancelling means for cancelling the status change information after completion of the formation of the status information, wherein a cancel state cancelled by the cancelling means is maintained at least for a predetermined time.

According to still another aspect of the invention, there is provided a control method for an image forming apparatus, comprising: a status change notifying step of transmitting and receiving a signal between image control means for controlling a formation of image data and image formation control means for controlling image forming means for performing a forming process of the image data onto a recording paper and allowing the image formation control means to detect status change information of the image forming means and notify the image control means of the status change information; a status information forming step of forming status information of the image forming means when the status change information is notified to the image control means by the status change notifying step; a status information notifying step of notifying the image control means of the status information formed by the status information forming step; and a cancelling step of cancelling the detected status change information in response to completion of the formation of the status information by the status information forming step, wherein the method further comprises a cancel state maintaining step of maintaining the cancel state cancelled by the cancelling step at least for a predetermined time.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to the drawings.

Figure 1:
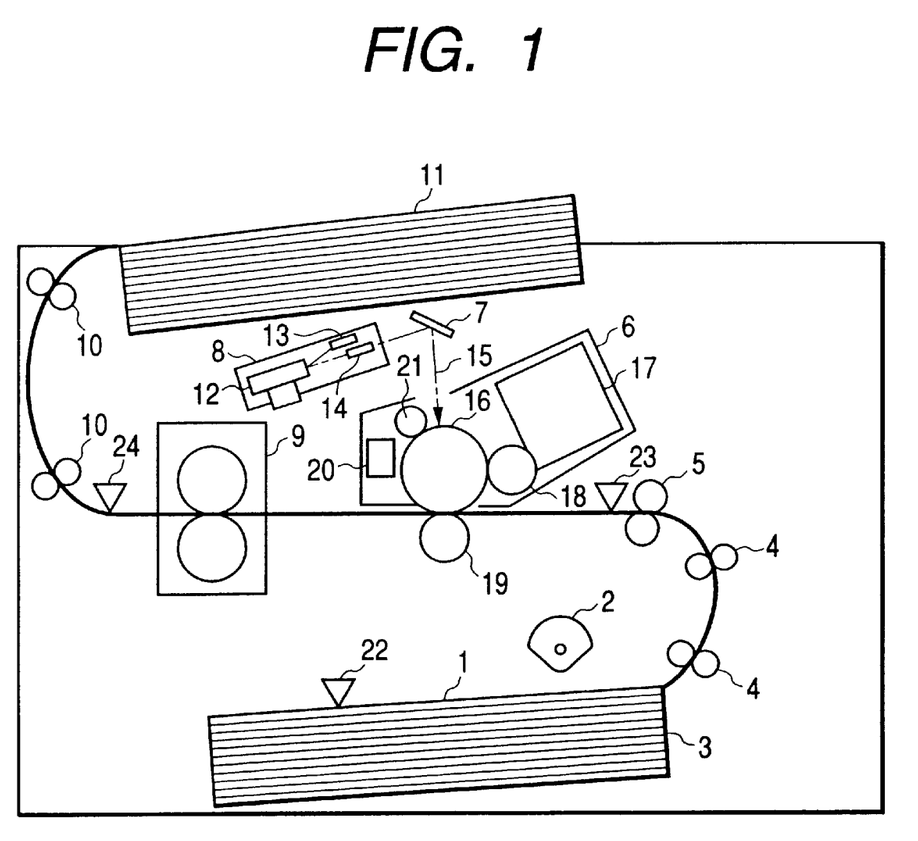
FIG. 1 is an internal structure diagram showing an embodiment of an image forming apparatus according to the invention.

FIG. 1 is an internal constructional diagram schematically showing an electrophotographic printer as an image forming apparatus according to the invention. The electrophotographic printer comprises: a sheet cassette 3 in which predetermined recording papers (cut sheets) 1 are enclosed and which has a pickup roller 2; a resist roller pair 5 to which the recording paper 1 is fed by a proper number of conveying roller pairs 4; a developing unit 6 to which the recording paper 1 conveyed to the resist roller pair 5 is fed; an optical unit 8 for supplying a laser beam 15 onto a photosensitive drum 16 of the developing unit 6 via a reflecting mirror 7; a fixing unit 9 for fixing a toner image on the recording paper 1; and a paper ejecting portion 11 for ejecting the recording paper 1 conveyed by a plurality of paper ejecting roller pairs 10.

The optical unit 8 has: a semiconductor laser 12 for emitting the laser beam 15 of a predetermined wavelength; a laser driver 13 for driving the semiconductor laser 12; and a rotary polygon mirror 14.

The developing unit 6 comprises: the photosensitive drum 16 to which the laser beam 15 from the optical unit 8 reflected by the reflecting mirror 7 is irradiated and which forms an electrostatic latent image; a developing device 17 for visualizing the electrostatic latent image formed on the photosensitive drum 16 by a developing material of a predetermined color (for example, black); a pre-transfer charging device 18 for applying a high voltage to the toner image developed by the developing device 17; a transfer charging device 19 for transferring the toner image developed on the photosensitive drum 16 to the recording paper 1; a cleaning device 20 for cleaning residual toner; and a charging roller 21 for uniformly charging charges to the photosensitive drum 16.

Reference numeral 22 denotes a sheet sensor for detecting whether the recording papers 1 have been enclosed in the sheet cassette 3 or not, namely, whether what is called "absence of papers" has occurred or not.

Reference numeral 23 denotes a regist sensor for detecting a front edge of the recording paper 1 conveyed to the resist roller pair 5 and 24 indicates an ejection sensor for detecting whether the toner image has been fixed to the recording paper 1 and the recording paper has been ejected from the fixing unit 9 or not. When a staying time of the recording paper in an interval between the regist sensor 23 and ejection sensor 24 is equal to or longer than a predetermined time, the ejection sensor 24 detects that a jam of papers has occurred.

The printing operation of the electrophotographic printer will now be described.

In the electrophotographic printer, a video signal is inputted to the laser driver 13 and the laser beam 15 emitted from the semiconductor laser 12 is subsequently on/off switched in response to the video signal. The laser beam 15 is swung right and left by the rotary polygon mirror 14 and scans on the photosensitive drum 16. The electrostatic latent image of the image data is formed on the photosensitive drum 16. The electrostatic latent image is visualized by the developing material (toner) of a predetermined color (for example, black) by the developing device 17. The residual toner on the photosensitive drum 16 is cleaned by the cleaning device 20 before the laser beam 15 is irradiated and the charges are uniformly charged on the photosensitive drum 16 by the charging roller 21.

The recording paper 1 is conveyed to the resist roller pair 5 by the conveying roller pairs 4. The resist roller pair 5 feeds the recording paper 1 so that the front edge of the toner image developed on the photosensitive drum 16 is matched with the front edge of the recording paper 1 conveyed from the sheet cassette 3. The predetermined high voltage is applied to the toner image by the pre-transfer charging device 18 before it is transferred to the recording paper 1. Subsequently, the toner image is transferred to the recording paper 1 by the transfer charging device 19 and, thereafter, it is pressurized and heated by the fixing unit 9. The recording paper 1 is ejected to the paper ejecting portion 11 via the paper ejecting roller pairs 10.

Figure 2:
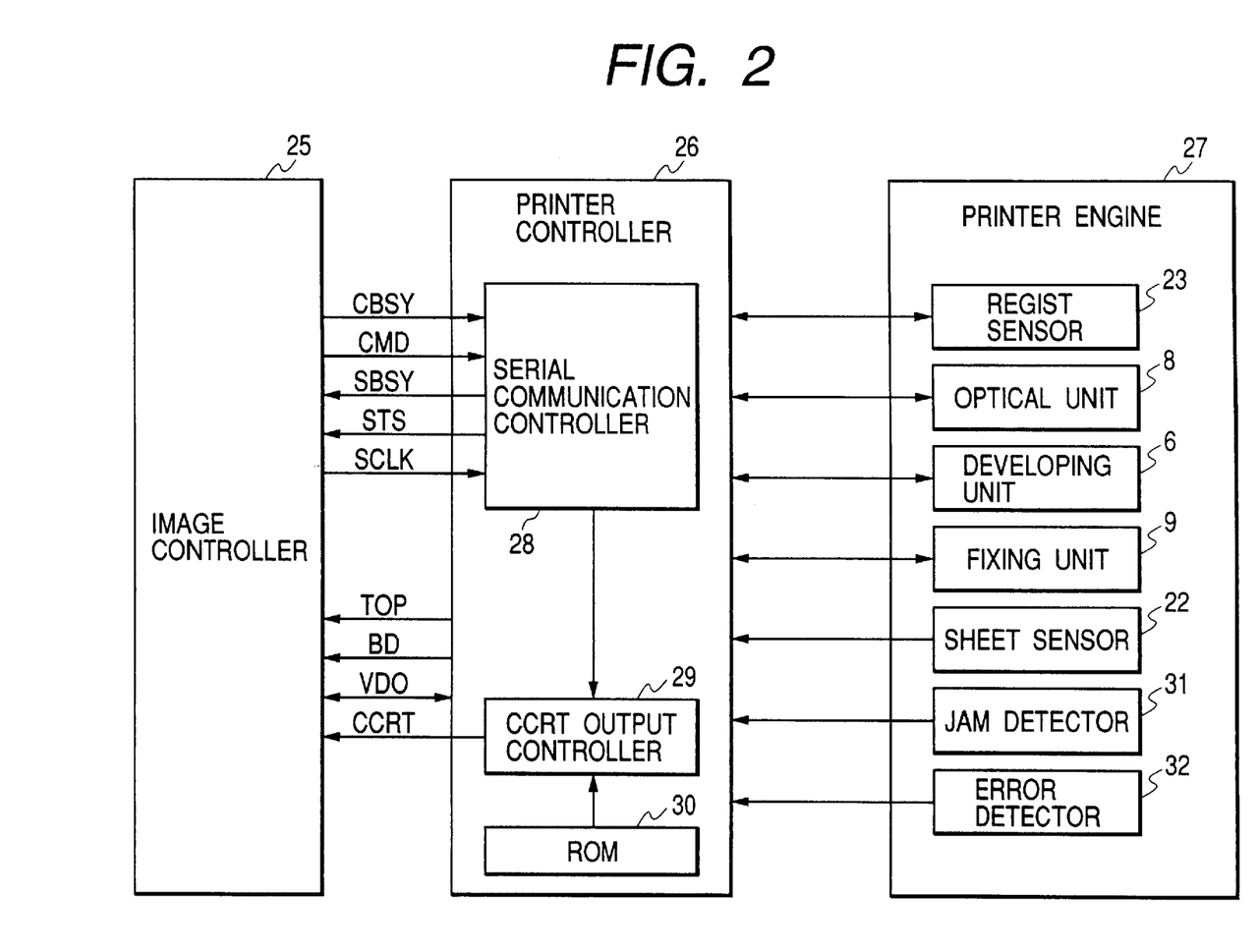
FIG. 2 is a block constructional diagram showing the first embodiment of a control system of the image forming apparatus.

FIG. 2 is a block constructional diagram showing a control system of the electrophotographic printer. The control system has an image controller 25 and a printer controller 26. The image controller 25 and printer controller 26 mutually transmit and receive predetermined signals and control each component portion of a printer engine 27 on the basis of results of the signal transmission and reception.

That is, the image controller 25 performs communication with a host computer (not shown), receives image data therefrom, and further, develops the received image data into printable information. The image controller also supplies a CBSY signal (strobe signal) as a command transmission permission signal on the serial communication, a CMD signal showing a serial command, and a sync clock signal (SCLK signal) for transmitting the CMD signal and a status signal (STS signal), which will be explained hereinlater, to the printer controller 26.

The printer controller 26 has a serial communication controller 28, receives the foregoing CBSY signal, CMD signal, and SCLK signal, and controls the developing unit 6 having therein high voltage system devices such as resist sensor 23, optical unit 8, pre-transfer charging device 18, and the like, and further, a heater temperature of the fixing unit 9 on the basis of reception results. The printer controller 26 further supplies an SBSY signal (strobe signal) as a transmission permission signal showing the permission of the transmission of the status signal indicative of the status of the printer engine and the status signal (STS signal) to the image controller 25 from the serial communication controller 28.

A TOP signal for instructing the start of transmission of the image signal so that the image data is vertically synchronously recorded onto the recording paper 1 and a BD signal for allowing the image data to be horizontally synchronized with the main scanning direction are transmitted from the printer controller 26 to the image controller 25. A video signal (VDO signal) is supplied from the image controller 25 to the printer controller 26.

A CCRT output controller 29 having therein a timer and an ROM 30 in which a predetermined value for setting a timer time has previously been stored are further provided for the printer controller 26. Status information from the sheet sensor 22 for detecting the presence or absence of the papers, a jam detector 31 for detecting whether the recording paper 1 which had passed through the regist sensor 23 has passed through the ejection sensor 24 within a predetermined time or not, and an error detector 32 for detecting errors of various component members (for example, laser driver 13) is supplied to the printer controller 26.

Under the control of the CCRT output controller 29, the printer controller 26 supplies the CCRT signal as a status change signal to the image controller 25 and supplies the status information to the image controller 25 by the STS signal. Specifically speaking, when the absence of the papers, a jam of the papers, or an error of the component members is detected, the CCRT output controller 29 determines that a status change occurred, changes the CCRT signal from "false" to "true", and notifies the image controller 25 of the occurrence of the status change. The serial communication controller 28 starts to prepare the transmission of the STS signal according to a situation of the status change, changes the CCRT signal from "true" to "false" simultaneously with the completion of the transmission preparation of the STS signal, and notifies the image controller 25 of the completion of the transmission preparation. After that, the controller 28 transmits the STS signal to the image controller 25 and notifies the image controller 25 of the contents of the status change.

Figure 3:
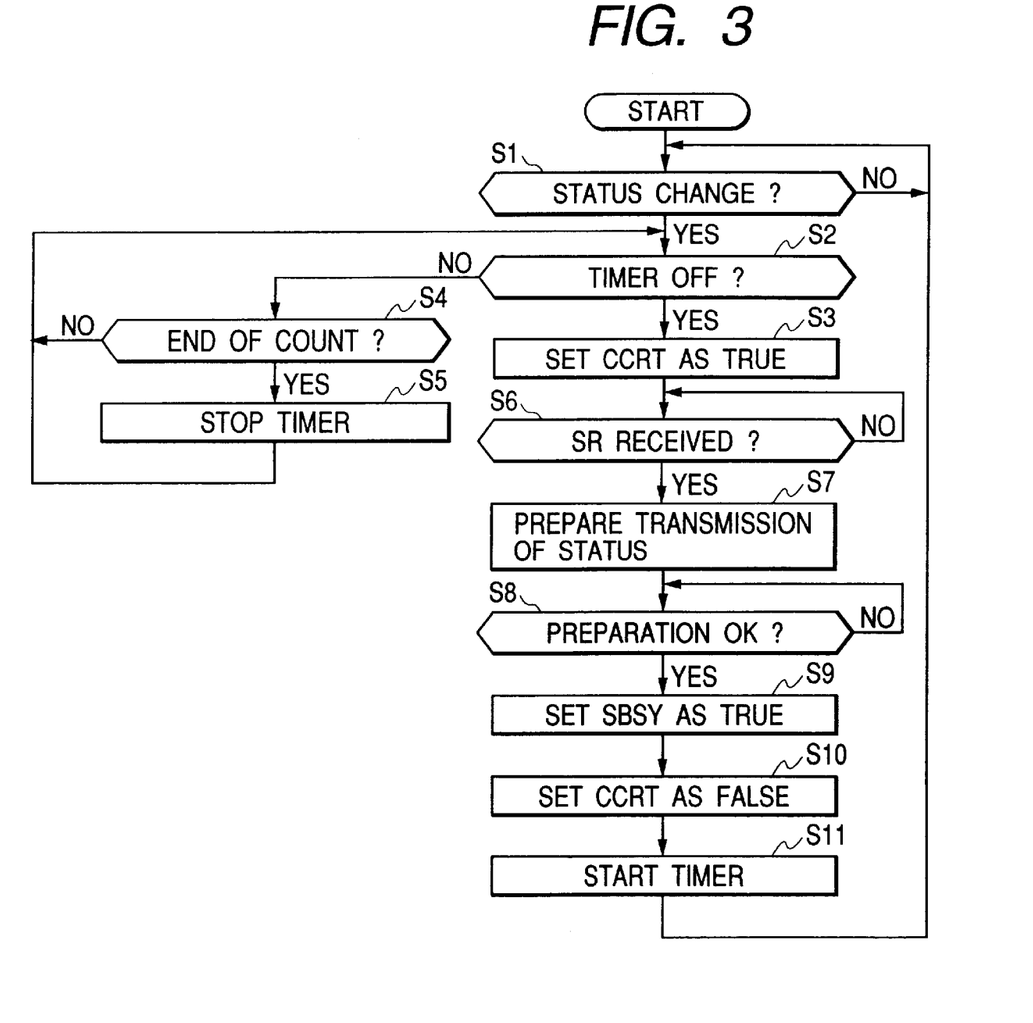
FIG. 3 is a flowchart showing the first embodiment of a control procedure of the image forming apparatus of the invention.

FIG. 3 is a flowchart showing a control method of the electrophotographic printer. This control flow is executed by the printer controller 26.

First, in step S1, the printer controller 26 discriminates whether a status change such as presence or absence of the papers, jam of the papers, error, or the like of the printer engine 27 has occurred or not on the basis of output results of the sheet sensor 22, jam detector 31, and error detector 32.

When it is decided in step S1 that there is the status change, whether an output monitoring timer of the CCRT signal is OFF or not is discriminated in step S2. If YES, the CCRT signal is immediately set to "true" (step S3). If NO, namely, when the output monitoring timer is operating, whether the counting operation of the output monitoring timer has been finished or not is discriminated (step S4). If the counting operation is not finished yet, the processing routine is returned to step S2 and the discriminating process in step S2 to step S4 is repeated. When the counting operation of the output monitoring timer is finished after that, the operation of the output monitoring timer is stopped (step S5). The processing routine is returned to step S2.

Subsequently, when the operation of the output monitoring timer is stopped, the answer in step S2 is YES and step S3 follows. The CCRT signal is set to "true".

In step S6, whether a status request command SR from the image controller 25 has been received or not is discriminated. When the status request command SR is received, a transmission preparation for notifying the image controller 25 of a current status of the printer engine 27 is started (step S7). Whether the transmission preparation of the status signal has been finished or not is discriminated (step S8). When the transmission preparation of the status signal is finished, the SBSY signal indicative of the transmission permission of the status signal is set to "true" (step S9). Further, the CCRT signal is set to "false" (step S10). After that, the timer time of the output monitoring timer is further set to a predetermined value stored in the ROM 30 and the counting operation of the output monitoring timer is started (step S11). The processing routine is returned to step S1.

Figure 4:
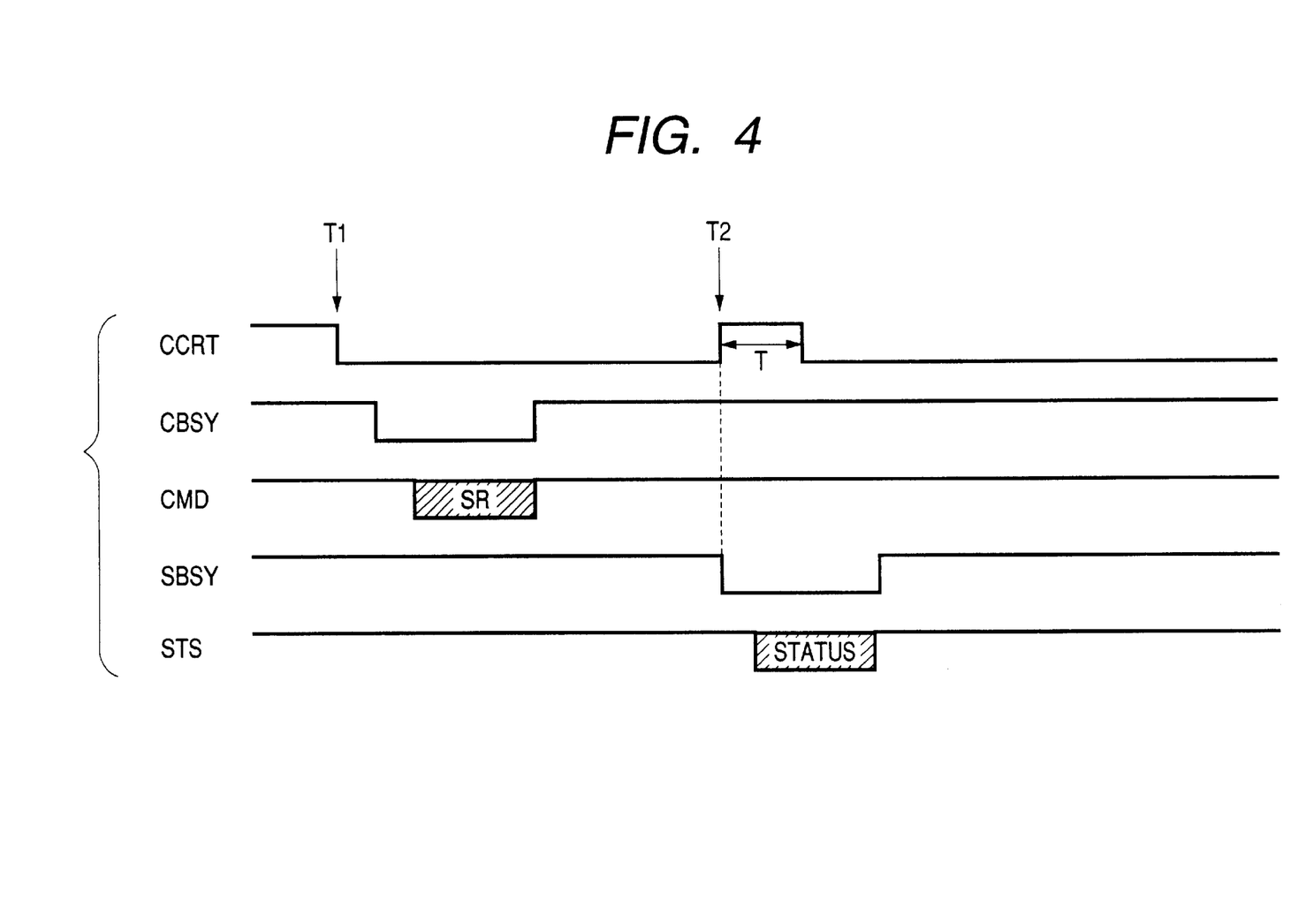
FIG. 4 is a timing chart showing generation timings for various signals of the image forming apparatus.

FIG. 4 is a timing chart showing generation timings for various signals of the electrophotographic printer.

That is, as shown in FIG. 4, when the printer controller 26 detects the status change (absence of papers, or the like) of the printer engine at time T1, the printer controller 26 changes the CCRT signal from "false" to "true" and transmits the "true" CCRT signal to the image controller 25. The image controller 25 which received the "true" CCRT signal transmits the CBSY signal to the printer controller 26 and, thereafter, sends the status request command SR to the printer controller 26 by the CMD signal. The printer controller 26 subsequently starts a preparation for returning the status signal (STATUS) to the image controller 25. The printer controller 26 sets the SBSY signal to "true" at time T2 when the returning preparation is completed, notifies the image controller 25 of the completion of the returning preparation of the status information, and resets the CCRT signal to "false". The printer controller 26 further starts the operation of the output monitoring timer simultaneously with the resetting to "false". The CCRT signal is set to "true" at a point when the counting operation of the output monitoring timer is finished (after the elapse of time T from time T2) if another status change occurred, the CCRT signal is transmitted to the image controller 25, and the operation similar to that mentioned above is repeated.

The status information is sent to the image controller by the STS signal.

In the embodiment, since the "false" period of the CCRT signal is forcedly assured by the output monitoring timer as mentioned above, even if the status change continuously occurred at short time intervals, the "false" period can be certainly assured. Therefore, the image controller 25 can certainly recognize the status change of the printer engine without a limitation on an interrupting process or software process.

A predetermined value for timer setting which is stored in the ROM 30 is set to a value that is sufficiently larger than the time of generation of noises or the like at the time when the image controller 25 executes the interrupting process or the like, so that the above effect can be obtained.

Figure 5:
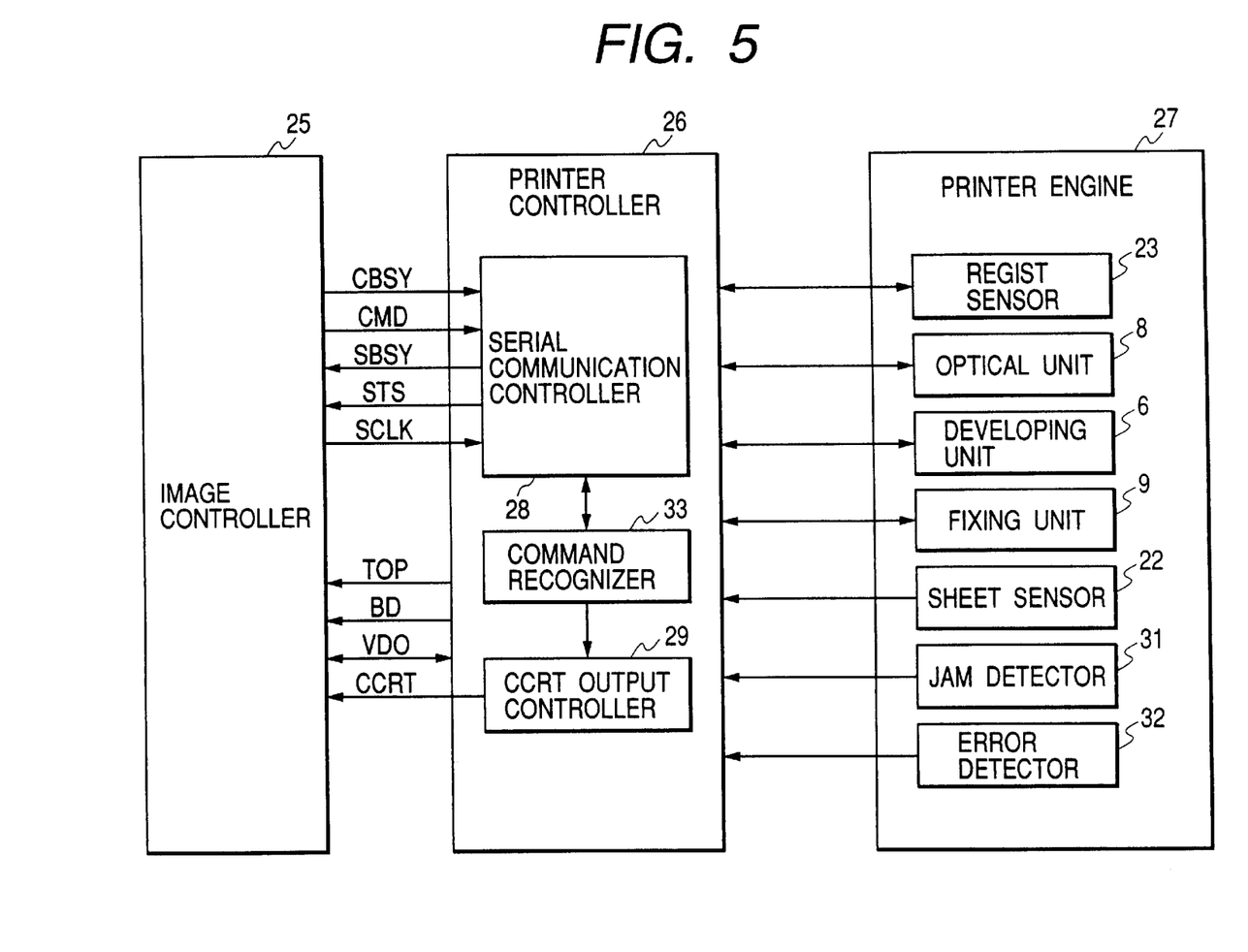
FIG. 5 is a block constructional diagram showing the second embodiment of a control system of an image forming apparatus.

FIG. 5 is a block constructional diagram showing the second embodiment of the invention. In the second embodiment, a command recognizer 33 is provided for the printer controller 26, the serial communication controller 28 analyzes the read command from the image controller 25, and transmits a predetermined status signal to the image controller 25 from the serial communication controller 28. The CCRT output controller 29 makes the setting time of the output monitoring timer variable on the basis of a recognition result of the command recognizer 33 and controls the output of the CCRT signal.

Figure 6:
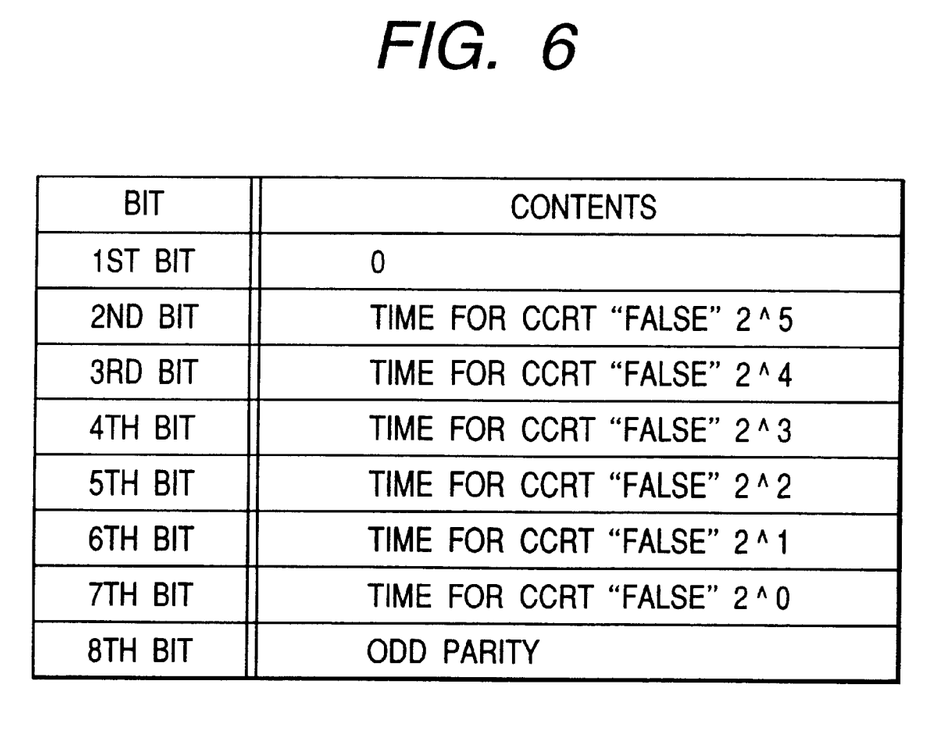
FIG. 6 is a table showing an example of setting of a guarantee time.

FIG. 6 shows an example of commands which are transmitted from the image controller 25 by serial communication.

The commands are transmitted by the 8-bit serial communication and the time is designated by a second byte command issued subsequently to a first byte command. In the second embodiment, a guarantee time for guaranteeing "false" of the CCRT signal is designated to a desired value by a binary code ($2^0$ to $2^5$) with regard to the second to sixth bits excluding the first bit and the odd parity bit (the eighth bit). That is, for example, by presetting the binary codes in such a manner that 000001B indicates 10 μsec, 000010B indicates 20 μsec, 000011B indicates 200 μsec, 000100B indicates 500 μsec, and the like, various resolutions and setting ranges can be selected.

Figure 7:
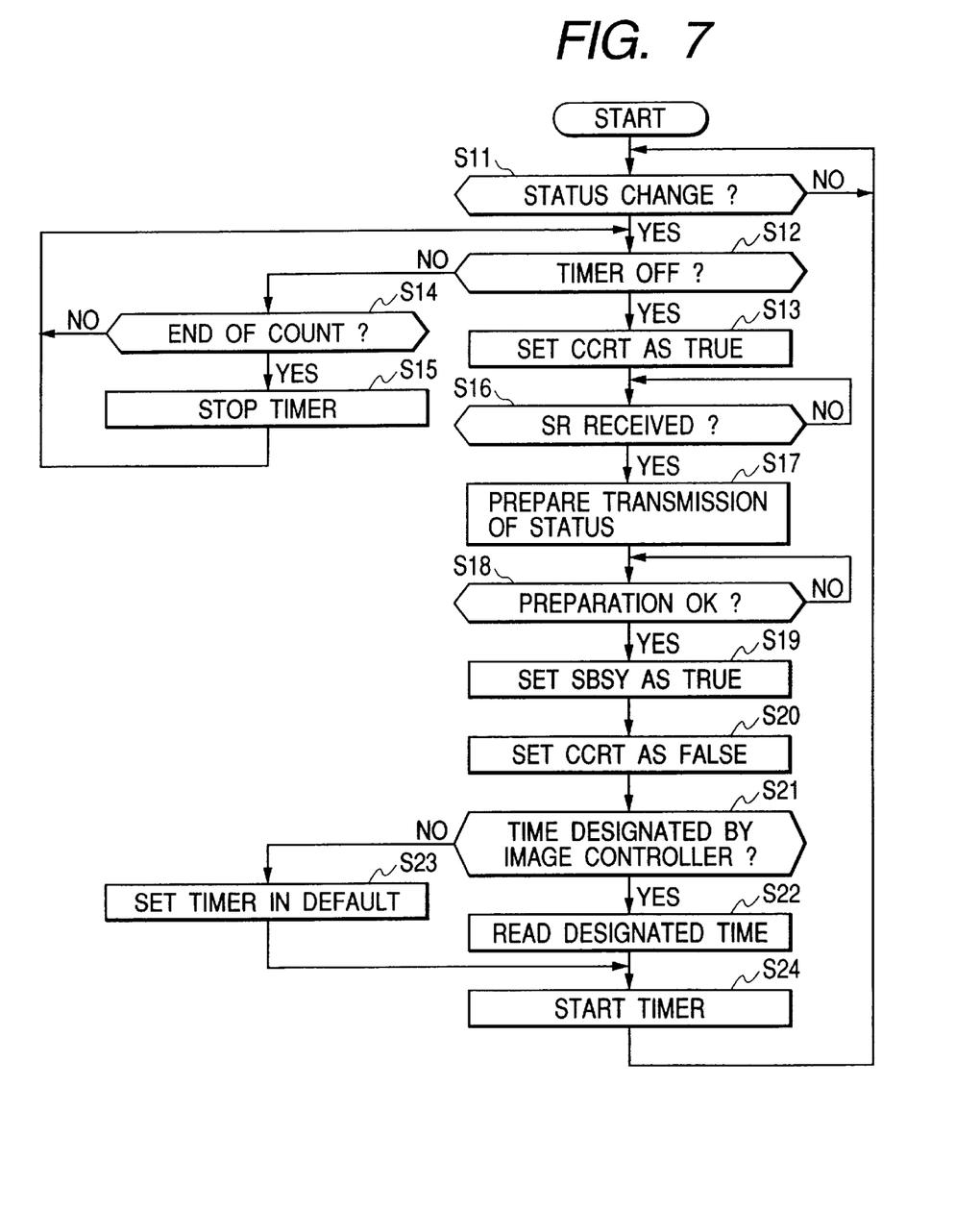
FIG. 7 is a flowchart showing the second embodiment of a control procedure in the image forming apparatus of the invention.

FIG. 7 is a flowchart showing a control procedure of the second embodiment. This program is executed by the printer controller 26.

That is, processes similar to those in steps S1 to S10 in the first embodiment mentioned above are executed in steps S11 to S20 and whether the guarantee time has been designated in the command transmitted from the image controller 25 or not is discriminated in step S21. If YES, namely, when the guarantee time has been designated, step S22 follows. The designated guarantee time is read and, thereafter, step S24 follows. If NO in step S21, the output monitoring time is set to a predetermined value (default value) in a manner similar to the first embodiment: The processing routine advances to step S24.

In step S24, the count value of the output monitoring timer is set to the guarantee time designated in step S22 or the predetermined value set in step S23, the counting operation of the output monitoring timer is started, and the processing routine is returned to step S11.

In the second embodiment, since the "false" period of the CCRT signal is set in accordance with the command generated from the image controller 25, even if image controllers of different specifications are connected to the same printer, the optimum guarantee time in which the "false" period can be assured can be set. The degree of freedom on designing of the image controller can be further raised.

According to the invention as described in detail above, after the status change of the image forming means was cancelled, even if another status change immediately occurs, the cancel state can be maintained at least for a predetermined time. Therefore, even in case of reading the status change notifying means by the interrupting process, the limitation on designing is small and the reliability can be raised.

The present invention is not limited to the foregoing embodiments but many modifications and variations are possible within the spirit and scope of the appended claims of the invention.

What is claimed is:

1. An image forming apparatus comprising:
   image control means for controlling a formation of image data;
   image forming means for forming said image data onto a recording paper and outputting; and
   image formation control means for transmitting and receiving a signal to/from said image control means and controlling said image forming means,
   wherein said image formation control means has
      status change notifying means for detecting status change information of said image forming means and notifying said image control means of said status change information,
      status information forming means for forming status information of said image forming means when the status change information is notified to said image control means by said status change notifying means,
      status information notifying means for notifying said image control means of the status information formed by said status information forming means, and
      cancelling means for cancelling the status change information detected by said status change notifying means in response to completion of the formation of the status information by said status information forming means,
   and said image formation control means has cancel state maintaining means for maintaining a cancel state cancelled by said cancelling means at least for a predetermined time,
   wherein even when said status change notifying means detects new status change information of said image forming means during the cancel state, the cancel state is maintained at least for the predetermined time.

2. An apparatus according to claim 1, wherein said image formation control means has memory means in which said predetermined time has been stored.

3. An apparatus according to claim 1, wherein said image control means has predetermined time designating means for designating at least one said predetermined time or more, and
   said cancel state maintaining means maintains said cancel state at least for the predetermined time designated by said predetermined time designating means.

4. An apparatus according to claim 1, wherein said status change includes at least a paper absence state, a jam state, and an abnormality of mechanical parts constructing said image forming means.

5. A control method for an image forming apparatus, comprising:

a status change notifying step of transmitting and receiving a signal between image control means for controlling a formation of image data and image formation control means for controlling image forming means for performing a forming process of the image data onto a recording paper and allowing said image formation control means to detect status change information of said image forming means and notify said image control means of said status change information;

a status information forming step of forming status information of said image forming means when the status change information is notified to said image control means by said status change notifying step;

a status information notifying step of notifying said image control means of the status information formed by said status information forming step; and a cancelling step of cancelling said detected status change information in response to completion of the formation of the status information by said status information forming step, wherein said method further comprises a cancel state maintaining step of maintaining the cancel state cancelled by said cancelling step at least for a predetermined time, wherein even when said status change notifying step detects new status change information of said image forming means during the cancel state, the cancel state is maintained at least for the predetermined time.

6. A method according to claim 5, wherein said image formation control means previously stores said predetermined time.

7. A method according to claim 5, wherein said image control means designates at least one said predetermined time or more and said image formation control means receives said predetermined time designated by said image control means, and in said cancel state maintaining step, said cancel state is maintained at least for said designated predetermined time.

8. A method according to claim 5, wherein said status change includes at least a paper absence state, a jam state, and an abnormality of mechanical parts constructing said image forming means.

9. An image forming apparatus comprising:

image forming means for forming an image onto a recording medium on a basis of image data sent from an external apparatus;

obtaining means for obtaining status change information of said image forming means;

status change notifying means for notifying said external apparatus of said status change information;

status information forming means for forming status information of said image forming means when said status change information is notified; and cancelling means for cancelling said status change information after completion of the formation of said status information, wherein a cancel state cancelled by said cancelling means is maintained at least for a predetermined time, wherein even when said status change notifying step detects new status change information of said image forming steps during the cancel state, the cancel state is maintained at least for the predetermined time.

10. An apparatus according to claim 9, further comprising memory means in which said predetermined time has been stored.

11. An apparatus according to claim 9, wherein said status change includes at least a paper absence state, a jam state, and an abnormality of mechanical parts constructing said image forming means.

12. An image forming method comprising:

an image forming step of forming an image onto a recording medium on a basis of image data sent from an external apparatus;

an obtaining step of obtaining status change information formed by said image forming step;

a status change notifying step of notifying said external apparatus of said status change information;

a status information forming step of forming status information in said image forming step when said status change information is notified; and a cancelling step of cancelling said status change information after completion of the formation of said status information, wherein a cancel state cancelled by said cancelling step is maintained at least for a predetermined time, wherein even when said status change notifying step detects new status change information of said image forming step during the cancel state, the cancel state is maintained at least for the predetermined time.

* * * * *